(12) United States Patent
Funk et al.

(10) Patent No.: US 8,990,014 B2
(45) Date of Patent: Mar. 24, 2015

(54) METHOD TO SCALE INERTIAL LOCATION DATA USING DIRECTIONAL AND/OR SCALE CONFIDENCE CONSTRAINTS

(71) Applicant: TRX Systems, Inc., Greenbelt, MD (US)

(72) Inventors: Benjamin Funk, Hanover, MD (US);
Dan Hakim, Silver Spring, MD (US);
John Karvounis, Bowie, MD (US);
Carole Teolis, Glenn Dale, MD (US)

(73) Assignee: TRX Systems, Inc., Greenbelt, MD (US)

(*) Notice: Subject to any disclaimer, the term of this patent is extended or adjusted under 35 U.S.C. 154(b) by 0 days.

(21) Appl. No.: 14/212,529

(22) Filed: Mar. 14, 2014

(65) Prior Publication Data
US 2014/0278080 A1    Sep. 18, 2014

Related U.S. Application Data

(60) Provisional application No. 61/792,856, filed on Mar. 15, 2013.

(51) Int. Cl.
*G01C 21/16*    (2006.01)
*G01C 21/08*    (2006.01)

(52) U.S. Cl.
CPC .............. *G01C 21/165* (2013.01); *G01C 21/08* (2013.01)
USPC ........... 701/500; 701/411; 701/412; 701/413; 701/501; 701/502; 701/503; 701/504; 701/505; 701/506; 701/507; 701/508; 701/509; 701/510

(58) Field of Classification Search
CPC ...................................... G01C 21/16
USPC ................................. 701/411–413, 500–510
See application file for complete search history.

(56) References Cited

U.S. PATENT DOCUMENTS

| | | | |
|---|---|---|---|
| 6,246,468 B1* | 6/2001 | Dimsdale | 356/4.02 |
| 6,282,496 B1* | 8/2001 | Chowdhary | 701/446 |
| 6,826,478 B2* | 11/2004 | Riewe et al. | 701/470 |
| 6,853,909 B2* | 2/2005 | Scherzinger | 701/472 |
| 7,577,440 B2* | 8/2009 | Trux et al. | 455/456.1 |
| 7,747,409 B2* | 6/2010 | Ladetto et al. | 702/150 |
| 8,165,150 B2 | 4/2012 | Aweya et al. | |
| 8,296,065 B2* | 10/2012 | Haynie et al. | 701/505 |
| 8,504,292 B1* | 8/2013 | Cote et al. | 701/500 |
| 8,694,251 B2* | 4/2014 | Janardhanan et al. | 701/512 |
| 8,930,163 B2* | 1/2015 | Kordari et al. | 702/160 |
| 2007/0250261 A1* | 10/2007 | Soehren | 701/207 |
| 2009/0005985 A1* | 1/2009 | Basnayake | 701/214 |
| 2009/0043504 A1 | 2/2009 | Bandyopadhyay et al. | |
| 2010/0114633 A1* | 5/2010 | Sislak et al. | 705/7 |
| 2012/0065883 A1* | 3/2012 | Williamson | 701/501 |
| 2012/0078501 A1* | 3/2012 | Haleem | 701/408 |
| 2012/0136573 A1* | 5/2012 | Janardhanan et al. | 701/512 |
| 2013/0018582 A1* | 1/2013 | Miller et al. | 701/501 |
| 2013/0332098 A1 | 12/2013 | Funk et al. | |

OTHER PUBLICATIONS

U.S. Appl. No. 61/783,908, filed Mar. 14, 2013, Funk et al.
U.S. Appl. No. 61/792,856, filed Mar. 15, 2013, Funk et al.

\* cited by examiner

*Primary Examiner* — Mary Cheung
*Assistant Examiner* — Atul Trivedi
(74) *Attorney, Agent, or Firm* — Baker & Hostetler LLP

(57) ABSTRACT

Methods, systems, and computer readable storage media are presented for directional scaling of inertial path data to satisfy ranging constraints. The presented techniques take into account scaling confidence information. In addition to bounding potential scale corrections based on the reliability of the inertial path and the magnetic heading confidence, the techniques bound potential scale parameters based on constraints and solve for directional scale parameters.

20 Claims, 8 Drawing Sheets

Input

Output

METHOD TO SCALE INERTIAL LOCATION DATA USING DIRECTIONAL AND/OR SCALE CONFIDENCE CONSTRAINTS

CROSS REFERENCE TO RELATED APPLICATIONS

This application claims benefit under 35 U.S.C. §119(e) of Provisional U.S. Patent Application No. 61/792,856, filed Mar. 15, 2013, entitled "Method to Scale Inertial Location Data Using Directional and/or Scale Confidence Constraints," the contents of which is incorporated herein by reference in its entirety.

TECHNICAL FIELD

The present disclosure relates to calculating path data from sensor information.

BACKGROUND

High accuracy navigation solutions generally require the ability to fuse input from multiple sensors so as to make use of all available navigation information. Various types of ranging sensors are being developed for inclusion in navigation systems. For example, radio frequency ranging, sonar, and optical ranging are all being used in navigation systems. In many systems, multiple ranges to known locations (at least three) that are received at the same time (or in quick succession) may be used to triangulate a position. It is more difficult to fuse information into the navigation solution from single ranges to the same or different known locations spread out in time.

SUMMARY

Methods, systems, and computer readable storage media are described for directional scaling of inertial path data to satisfy ranging constraints. The presented techniques take into account scaling confidence information. In addition to bounding potential scale corrections based on the reliability of the inertial path and the magnetic heading confidence, the techniques bound potential scale parameters based on constraints and solve for directional scale parameters.

DETAILED DESCRIPTION OF ILLUSTRATIVE EMBODIMENTS

Embodiments of the present disclosure use constraint based optimization. Single ranges to known locations may be used to provide useful constraints on the inertial path developed from inertial sensor data, but these constraints must be applied carefully as part of a constraint based optimization. The concept of local or directional scaling is also introduced. Embodiments disclosed herein avoid possible issues caused by overlapping endpoint ranging constraints.

The NEON® tracking unit developed by TRX Systems, assignee of the present disclosure, is a navigation system that produces location coordinates, heading information, confidence estimates, and constraint data that may be used by a navigation engine of the navigation system to further improve the accuracy of the calculation of a path being taken by a person or object being tracked. Constraints on the navigation solution can be obtained from a variety of sources including GPS, ranging, building and other features, user corrections and check-ins, etc. The navigation system can use constraint based optimization to compute a globally optimal solution for location initialization, path rotation, path scale, and drift by tweaking these four parameters.

A problem may sometimes arise when there is variation in one or more of these parameters in different portions of the path so that a solution with constant global parameters does not exist. From a purely mathematical standpoint, it may not be possible to distinguish between errors caused by, for example, scale variability and those caused by a combination of other parameters.

Figure 1:
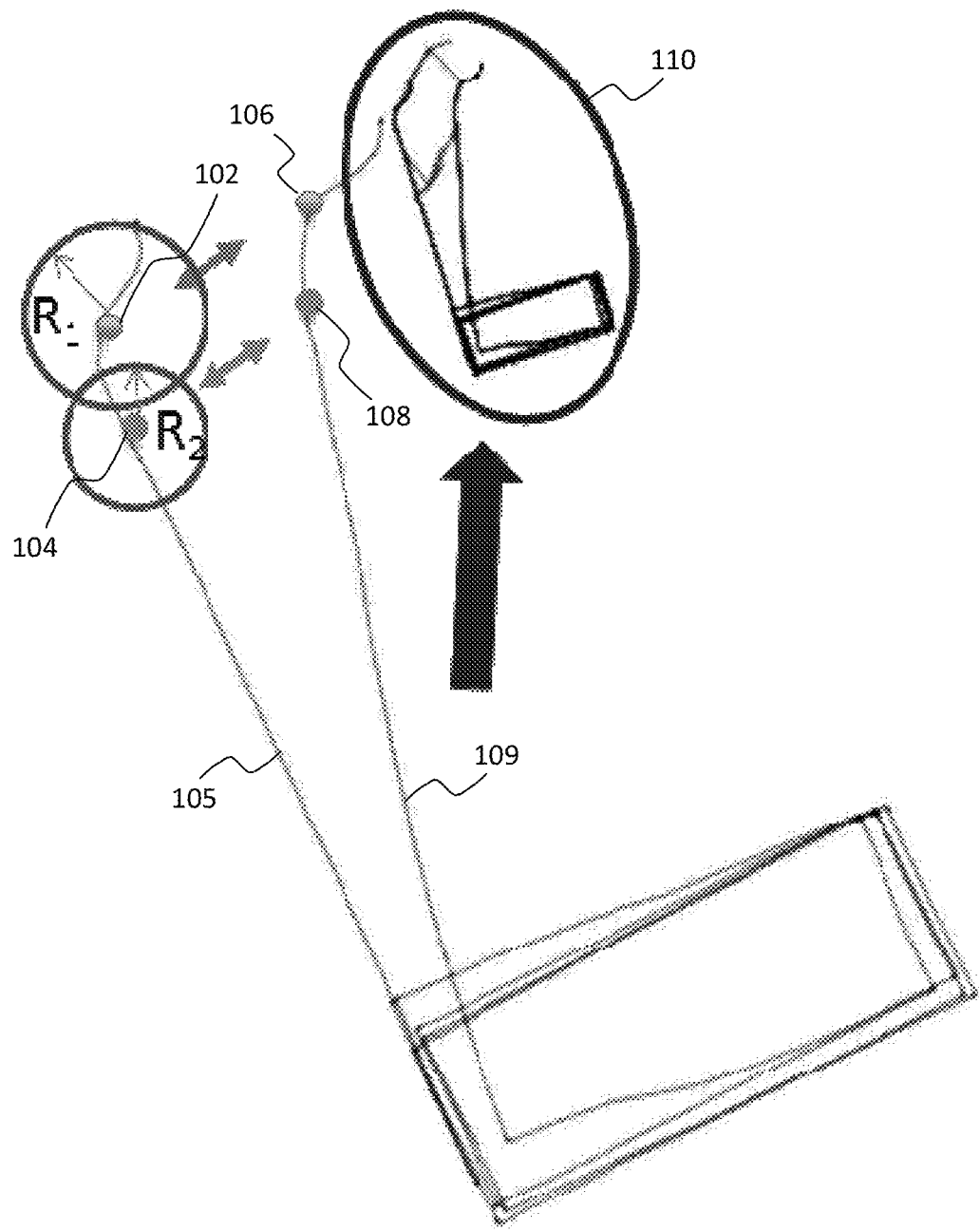
FIG. 1 illustrates an example where attempting to solve for several parameters at once can lead to an incorrect parameter choice, in this case the path scale parameter.

FIG. 1 illustrates an example where overlapping endpoint ranging constraints lead to incorrect scaling of the path in an effort to compensate for variation in another parameter that causes the end points not to be satisfied after solving for drift. The dots 102 and 104 are superimposed on a drift compensated path 105 generated by a global solver based on the input of dots 106 and 108 on path 109. The dots 106 and 108 represent path points that should lie within the range constraints $R_1$ and $R_2$, respectively. The drift compensated path 105 clearly does not come close to solving the constraints. Attempting to minimize a cost function (defined by the square distance error at the constraints) over several parameters at once, but without any bounds on the parameter space, can lead to mathematically correct, but unexpected results. In the example of FIG. 1, the solution of the optimization is shown inside the ellipse 110. In an attempt to solve the constraints in the global optimization, the best mathematical solution is to shrink the path 109, thus bringing the constraint points closer together. Whereas, in this instance, the solution that is most accurate would be to not scale the path 109 at all.

In some navigation system applications, it might be common to have overlapping constraints only near the endpoints of a path. For example, a firefighter may jump off of a vehicle where the navigation system was obtaining ranging constraints from mounted anchors on the vehicle. Then the fire fighter may enter a large building and finally return to the vehicle. For a path where the start and endpoint locations are known to be close and there is no other constraint, a scale factor near zero applied to the entire path will always allow for the constraint to be met. However, this answer is unreasonable and will almost always be incorrect.

The root cause of directional errors in pedometer type inertial tracking systems may be tied back to the mechanism used to determine step scale in the inertial path. This step scale is a heuristically estimated value based on a combination of measured inputs, including step frequency (i.e., walking speed). The step scale is typically most accurate when a person is moving using a consistent gait, e.g., when walking down a long hallway without changing speed. Small localized scale errors are often introduced during transitions, such as slowing down to turn or walking around an object. Also, scale errors can vary by motion type, for example, walking up a steep hill may have a slightly different error than walking on flat terrain. Because of these possible mechanisms for error, it makes sense to develop mechanisms to account for scale errors that are directional and that are local.

In addition to bounding potential scale corrections based on the reliability of the inertial path and the magnetic heading confidence, the present disclosure includes embodiments for bounding potential scale parameters based on constraints and solving for directional scale parameters, both of which will help to resolve this issue.

An embodiment for bounding scale parameter will first be described. Initialization values for drift and rotation and bounds on these parameters are first computed, for example, as described in patent application Ser. No. 13/915,998, filed Jun. 12, 2013, entitled "Methods for Improved Heading Estimation," which is incorporated herein by reference.

Figure 2:
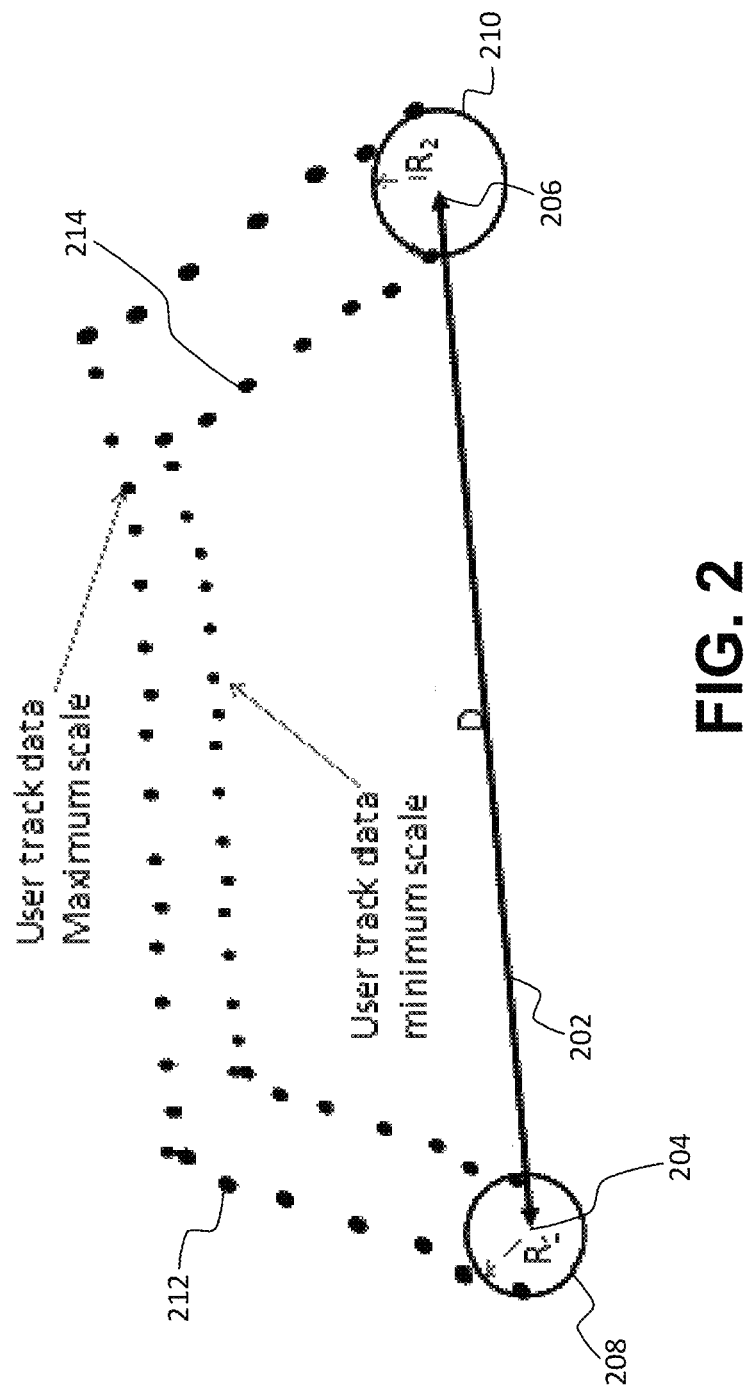
FIG. 2 illustrates that minimum and maximum scale values between any two constraints may be found by computing scale bounds and that path segment end points lie within constraint bounds.

Minimum and maximum scale values between any two constraints may be found by computing scale bounds, such that, given the correct rotation, offset and drift, the path segment end points lie within the constraint bounds. This is illustrated in FIG. 2. If an inertial path travels a distance D in a straight line 202 with endpoints 204 and 206 bounded by constraints 208 and 210, respectively, with radii $R_1$ and $R_2$, respectively, then global scale bounds (i.e., maximum scale parameter applied to the path results in 212 and minimum scale parameter to the path yields 214) are determined by computing $(D+R_1+R_2)/$(Length of Inertial Segment) and $(D-R_1-R_2)/$(Length of Inertial Segment).

These bounds are computed for all pairs of constraints that may be required to satisfy some minimum distance separation threshold (e.g., not overlapping by some number of meters) and some maximum time threshold (e.g., constraints within 5 minutes of each other). An initialization of the global scale is chosen in the intersection of all of the pair wise scale bounds for non-overlapping constraints to initialize the global scale for each path. One possible selection method would be to select the scale parameter whose value is closest to 1; e.g., the minimum change. If the intersection is empty, considering histograms of the scale intervals may help to guide the choice of a global scale that is most probable.

An embodiment for directional scaling will now be described. One embodiment includes rescaling the individual segments of the path in proportion to the amount that each individual segment contributes to the constraint error. To determine the amount that each segment contributes to the error, a dot product is computed between each segment vector and a unit vector in the direction of the constraint error. The result of this dot product is the projection of the segment vector onto the constraint error vector. The sign of this value indicates whether the segment vector contributes to the error in the negative or positive direction. The magnitude of the vector is used as the contributing weight for the scaling of the segment. The weight value is normalized for each segment by dividing by the sum of weights for all points.

It is informative to first consider the simple case of having a path with fixed end points. This method is then extended to cover the case where the constraints may occur at various locations along the path and the constraints may be looser, e.g. requiring the path to be in some region.

A method for determining end point constraints may be performed on sections of XY path points where a relative constraint between the start and end point is known. An embodiment of the basic method is described below. This embodiment may be used on many consecutive sections of inertial path data. Note that steps 3-6 may be completed in a single "for" loop.

In the embodiment, input data includes the following:
A list of inertial XY points along the sections of a path with drift correction applied;
Desired XY locations for path endpoints; and
Optional scale confidences for each path point in the XY points list.

The output data includes the corrected list of XY points.
An embodiment of basic method is as follows:
1. Compute Error Vector by subtracting desired endpoint coordinates with path endpoint coordinates.

$$E=[x_{desired}, y_{desired}]-[x_{end}, y_{end}]$$

2. Construct a difference vector $[dx_i, dy_i]$ for each point representing the change from the previous point in the path. The length of the difference vector is $\rho_i$. For each difference vector, compute a list of weights by computing the dot product of each difference vector and the unit vector in the direction of the error vector. Optional: multiply a scale confidence by each weight at this step.

$$w_i=[dx_i, dy_i] \cdot \hat{E}, \rho_i=\sqrt{dx^2+dy^2}$$

3. Normalize weight value by dividing by sum of absolute value of all weights.

$$w_i = w_i \Big/ \sum_{i=0}^{n} |w_i|$$

4. Compute the vector magnitude adjustment for each point vector by calculating the percent of the Error Vector proportional to the weight for the point.

$$\Delta p = \|E\| \times w_i$$

5. Compute scale adjustment for point vector. Note that $\Delta \rho$ with negative sign will result in scale <1.0, while $\Delta \rho$ with positive sign result in scale >1.0. If the weight for a point equals zero, AdjustScale should be set to zero.

$$\text{AdjustScale}=(\rho+\Delta\rho)/\rho$$

6. Adjust path points by multiplying by scale for each point.

$$dx\text{out}_i = \text{AdjustScale} \times dx_i, dy\text{out}_i = \text{AdjustScale} \times dy_i$$

7. Reconstruct path point list by computing cumulative sum of difference vectors.

Figures 3A, 3B:
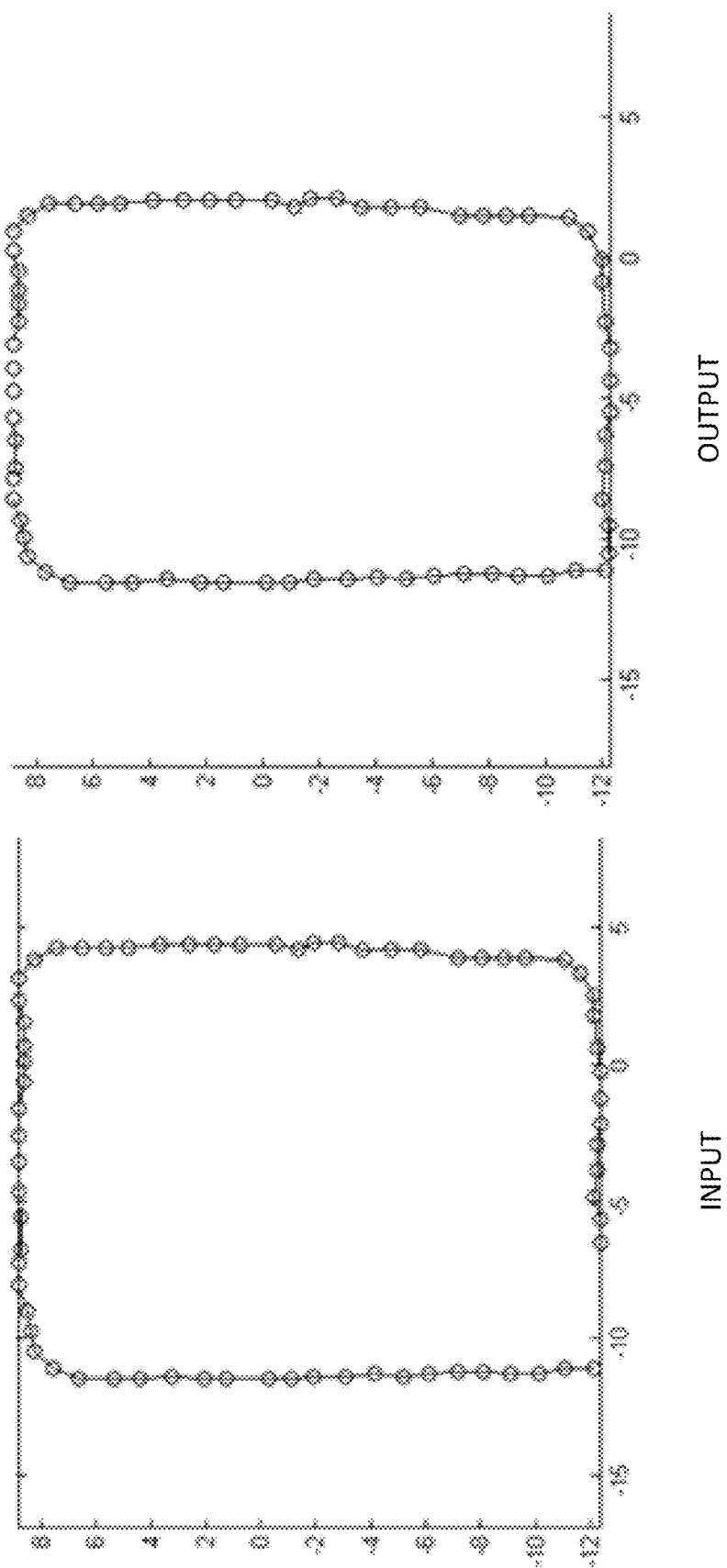
FIGS. 3A and 3B illustrate the difference between an input list of XY points from inertial sensors and a solved output list of XY points based on directional scaling using the basic method described herein.

An example of the above-described embodiment is illustrated by FIGS. 3A and 3B. In this example, the input data illustrated in FIG. 3A consists of a list of XY points from inertial sensors that have been corrected for drift and the desired XY locations for path endpoints. As will be noted, the two end points do not meet up. The procedure for the method, without the optional scale confidence for each XY point in the list, results in the output shown in FIG. 3B, where the end points now meet. This example demonstrates the concept of directional scaling; the solution is scaled only in the segment aligned with the direction of the error.

Figure 4A:
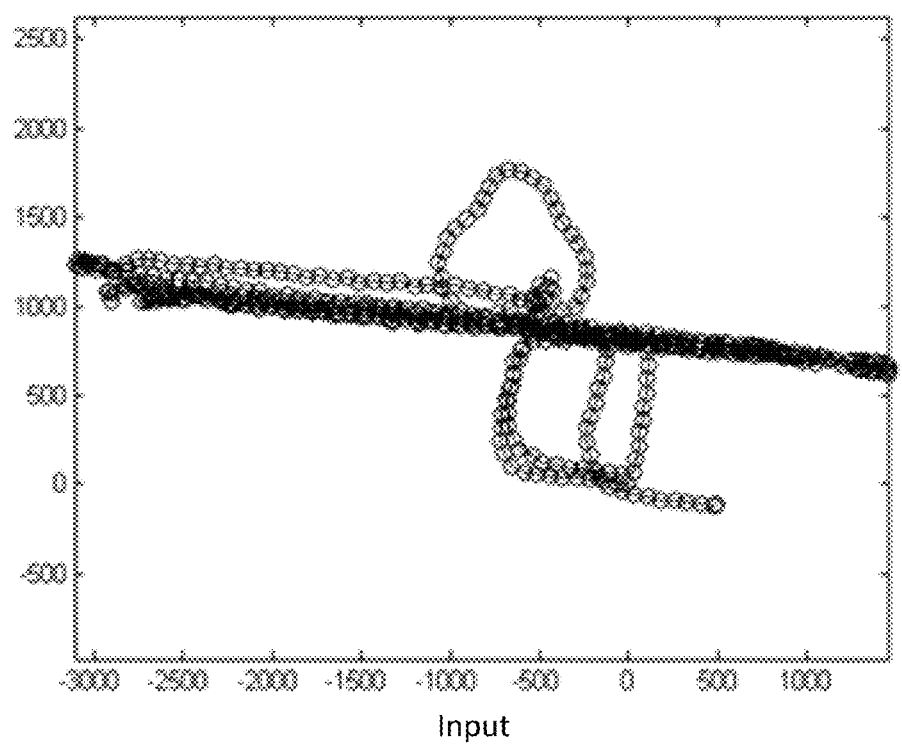
FIGS. 4A and 4B illustrate an example of directional scaling where the input to the embodiment is illustrated in FIG. 4A and the output of the embodiment is illustrated in FIG. 4B.
Figure 4B:
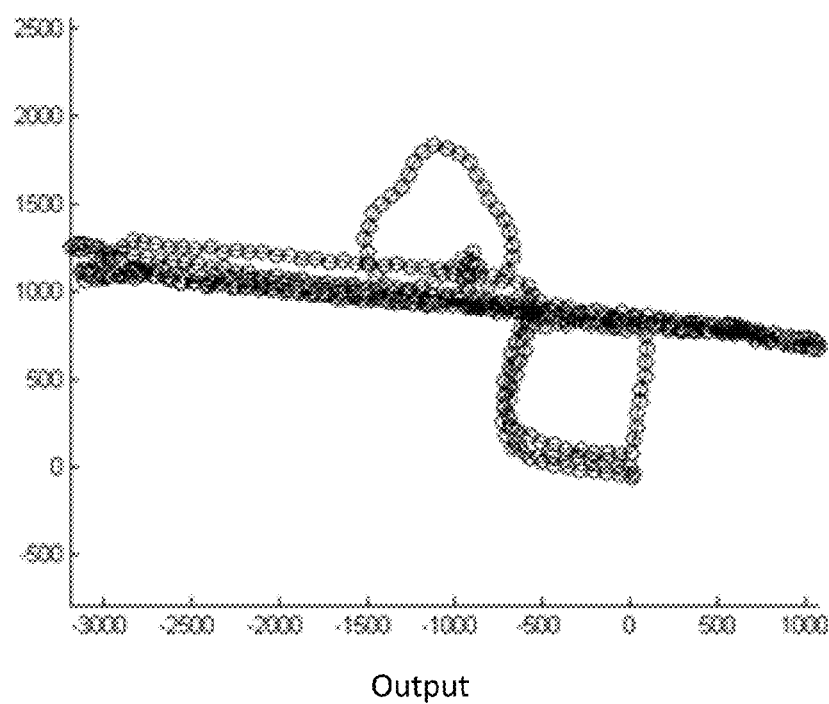

A second example is illustrated by FIGS. 4A and 4B, where the input to the embodiment is illustrated in FIG. 4A and the output of the embodiment is illustrated in FIG. 4B. In this example, the list of XY points was derived from the inertial sensors of a NEON tracking unit as a user wearing the unit follows a path as described below:

1. The user starts walking from a start point within an office on the 4th floor in an office building.
2. The user walks around the office, up the hall away from the office and then back to the office.
3. The user then goes down the stairs to the security desk on the first floor and walks around the security desk.
4. The user then takes the elevator back to the 4th floor and returns to the start point, which become the end point as well.

As noted in FIG. 4B, the output has the correct scaling where the path segments in the office are more closely aligned.

A further detailed embodiment of the basic method may be expressed in MATLAB code as follows:

```
function newList = adjustEndpoint(xyList, desiredEndpoint)
xin = xyList(:,1);
yin = xyList(:,2);
xout(1:length(xin)) = 0;
yout(1:length(yin)) = 0;
%Comput error vector. Step 1
correctionVector = [desiredEndpoint(1) - xin(end)
desiredEndpoint(2) - yin(end)];
cvMag = norm(correctionVector)
cvUnit = correctionVector./cvMag;
%Compute difference vectors. Step 2
dx = diff(xin);
dy = diff(yin);
%Compute magnitude and weight for each difference vector. Step 2
for i=1:length(dx)
    rho(i) = norm([dx(i) dy(i)]);
    ptWeight(i) = dot([dx(i) dy(i)], cvUnit);
end
%Normalize weight values by dividing by sum of weights. Step 3
weightSum = sum(abs(ptWeight))
dxout = 0;
dyout = 0;
for i=1:length(dx)
    %Compute scale adjustment for each difference vector. Step 5.
    if(ptWeight(i) == 0)
        adjustPercent = 0;
        rhoDelta(i) = 0;
    else
        rhoDelta(i) = cvMag * ptWeight(i)/weightSum; %Step 4.
        adjustPercent = (rho(i)+rhoDelta(i)) / rho(i); %Step 5.
    end
    %Adjust output path by scaling. Step 6
    dxout(i) = adjustPercent*dx(i);
    dyout(i) = adjustPercent*dy(i);
end
%Display weighted path points
figure; scatter(xin, yin, 10, [0 abs(ptWeight)]);
%Reconstruct path by accumulating difference vectors. Step 7.
xout = [0 cumsum(dxout)]';
yout = [0 cumsum(dyout)]';
%Adjust offset to keep first point in same place.
xout = xout + xyList(1,1);
yout = yout + xyList(1,2);
newList = [xout yout];
```

In a further embodiment, the basic method is extended to work on a path with multiple range constraints along the path. In this embodiment, the scale inconsistencies are distributed relatively evenly across path segments bounded not by fixed points, but by fixed ranges. The path reported by the NEON tracking unit may be a series of segments, each with an estimated length, $S_i$, and each with associated relative heading information. The path between any two points A and B may be written as $$\sum_{i \in [A,B]} \alpha_i \vec{s}_i \quad 0 \leq \alpha_i \leq 2$$

where $\vec{s}_i$ is the step vector and $\alpha_i$ is the adjustable step scale parameter. $\alpha_i$ is initialized to 1.

Ideally, this inertial path, as reported by the tracking unit, may be corrected to the true path by an analysis unit receiving data from the tracking unit by applying various correction parameters, including global offset, drift, rotation, and scale. In practice, these correction parameters vary slightly from segment to segment throughout the path. The present disclosure is focused on computation of the scaling parameters. Accordingly, it is assumed that prior to application of the present embodiment, that drift and rotation have already been compensated for in the data being analyzed. In addition, it is also assumed that scaling changes may be made only along the direction of a step by adjusting the scale parameter, that is, the relative heading information for the step should not be changed.

It should also be noted that global offset may not have been solved prior to analysis if the scale problem is solvable because after the scale parameters are computed a simple translation should give a solution with all constraints satisfied.

Figure 5:
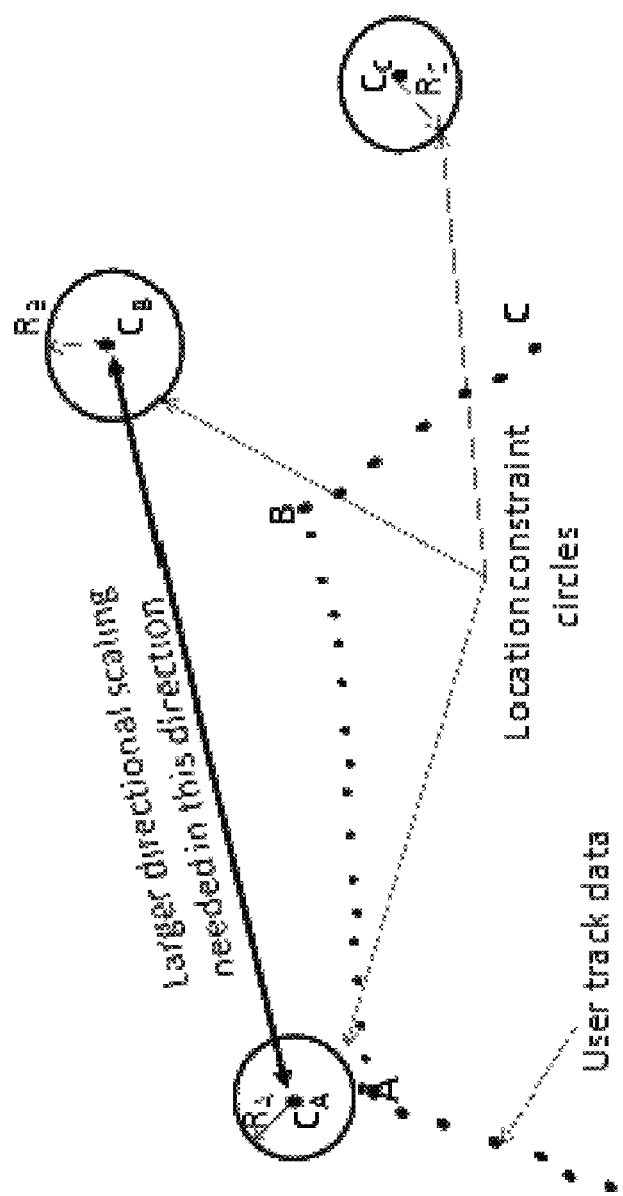
FIG. 5 illustrates an extension of the basic method on a path with multiple range constraints along the path.

FIG. 5 illustrates the above embodiment applied to a simple path with multiple constraints. In any such path, vectors may be computed between each pair of constraints and scale parameters may be computed such that constraints are satisfied pair wise. If there are n constraints, the number of constraint pairs is $$\binom{n}{2} = \frac{n!}{(n-2)!2!} = \frac{n(n-1)}{2}$$

Since the number of constraint pairs grows quickly with the number of constraints, a rule may be formulated for limiting the number of constraints considered. This rule may take into account errors in satisfying the constraints and the distribution of constraints so that the least amount of information is lost. For example, overlapping constraints may be redundant so ignoring them results in no loss of information.

One embodiment for limiting the number of constraints considered is through the use of convex optimization where the cost is the sum, over all pairs of constraints, of the squared distance between (the offset in the inertial path segment between the constraints) and (the nearest offset required between the constraints). This cost is minimized by adjusting the scale values on every step using a gradient descent algorithm. For this embodiment, adaptive step size may be used.

Additional heuristics may be applied to the selection of the set of applied constraints, before each iteration of the analyzer/solver, to improve performance. In the present embodiment, only constraints that will have the greatest impact on the solution, that is constraints with maximum addition to the cost and minimum constraint radius, may be used.

To better illustrate this, consider only one constraint pair A, B. Now define $\vec{\Delta}$ as the vector difference in distance between the constraint centers, $\vec{C}_B - \vec{C}_A$ and the path end point, which compute by summing scaled steps along the path between A and B $$\sum_{i \in [A,B]} \alpha_i \vec{s}_i$$

$$\vec{\Delta}_{AB} = \left(\vec{C}_B - \vec{C}_A - \sum_{i \in [A,B]} \alpha_i \vec{s}_i\right).$$

Figure 6:
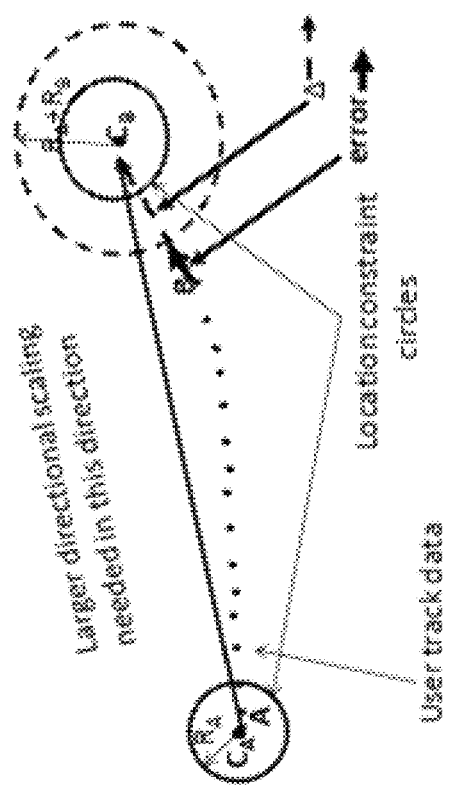
FIG. 6 illustrates a path rescaled along a direction until the path can satisfy both constraints, or equivalently, until the magnitude of $\vec{\Delta}$ is less than RA+RB.

The path is then rescaled along this direction until the path can satisfy both constraints, or equivalently, until the magnitude of $\vec{\Delta}$ is less than RA+RB. This is illustrated in FIG. 6, where the convex cost function over this constraint pair is defined by $$\text{Cost} = \max(\|\Delta_{AB}\|^2 - (R_A + R_B)^2, 0)$$

and the cost is minimized by adjusting the scale values, $\alpha_i$, on every step. The gradient of the cost is given by $$\frac{\partial \text{Cost}}{\partial \alpha_i} = \begin{cases} -2\vec{s}_i \cdot \vec{\Delta}_{AB} & \text{Cost} > 0 \\ 0 & \text{Cost} = 0 \end{cases} \quad i \in [A, B]$$

so that at each iteration $\alpha_i$ is adjusted to be $\alpha_i + \epsilon \vec{s}_i \cdot \vec{\Delta}_{AB}$ where $\epsilon$ is selected based on the minimization algorithm implementation.

Figure 7:
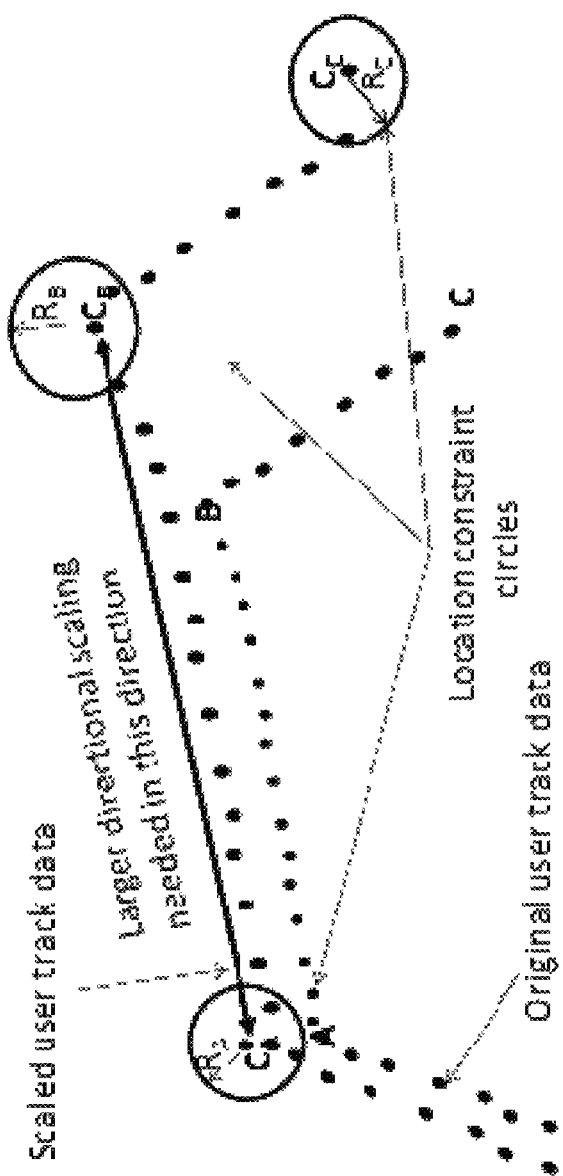
FIG. 7 illustrates, for the basic method, the gradient calculated for each step vector of the path may be the same as the dot products.

The solution over all constraint pairs, including multiple range constraints, as illustrated in FIG. 7, is similarly solved where the cost is then computed as the sum over all pairs $$\text{Cost} = \sum_{j=1, k=j+1}^{n} \sum_{k=j+1}^{n} \max(\|\vec{\Delta}_{jk}\|^2 - (R_j + R_k)^2, 0)$$

and the gradient adds a term for each pair the step lies in $$\frac{\partial \text{Cost}}{\partial \alpha_i} = \begin{cases} \sum_{jk:\vec{s}_i \in [j,k]} -2\vec{s}_i \cdot \vec{\Delta}_{jk} & \text{Cost} > 0 \\ 0 & \text{Cost} = 0 \end{cases}.$$

With respect to FIG. 7, for the segments between each of the constraint pairs, the gradient calculated for each step vector of the path may be the same as the dot products described in the basic method described above. As such it behaves approximately the same way for the simple case of a long path between two fixed points.

A confidence/error metric may be obtained as part of the output by looking at the scaling variation for each step. In general, this will fluctuate a small amount around $\alpha_i = 1$. If these fluctuations grow large, the result may need to be invalidated. For example, functions of the standard deviation or the median average deviation may provide good measures of variation around a value.

Figure 8:
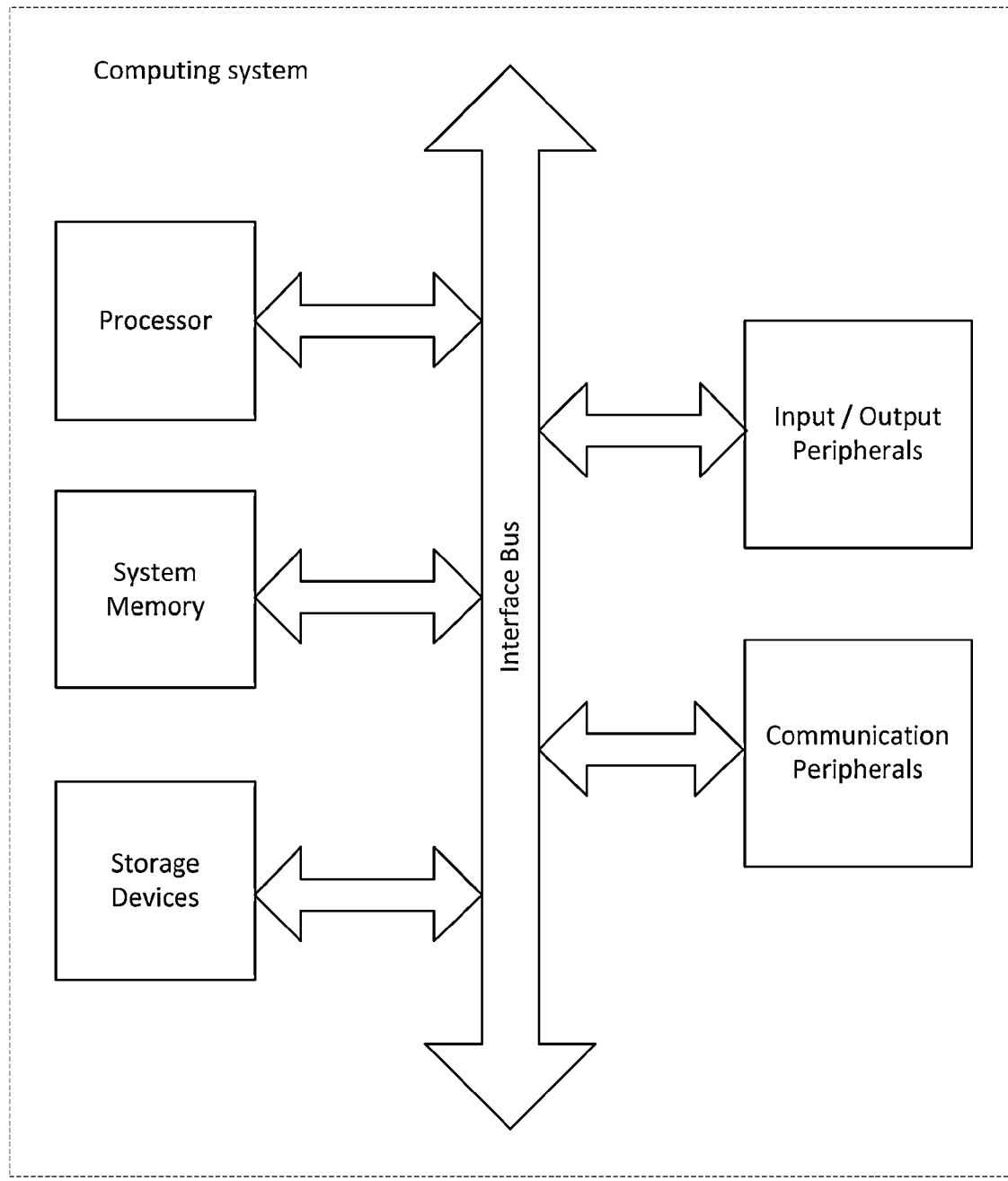
FIG. 8 illustrates an embodiment of a computing system.

As illustrated in FIG. 8, the methods and techniques described above may be implemented on a computing device associated with a user, a plurality of computing devices associated with a plurality of users, a server in communication with the computing device(s), or a plurality of servers in communication with the computing device(s). Additionally, the techniques may be distributed between the computing device(s) and the server(s).

For example, the computing device may be associated with a user that is in motion along a path and may collect and transmit raw data to the server that, in turn, processes the raw data to estimate the path of the user or computing device. Along the path, there may be a plurality of other computing devices that may be static such as electronic sensors, electronic checkpoints, radio frequency (RF) tags, RF transceivers and the like that are positioned at known locations to the server. The raw data that the computing device of the user transmits to the server may include information indicative of the positions or locations of this computing device relative to the static computing devices. Likewise, the server may receive raw data from the static computing devices indicative of the relative positions or locations of the computing device of the user. The raw data may be based on the various techniques of location estimation including, for example, RF ranging. When such techniques are used, constraints, such as RF range constraints, may be imposed on the raw data or on the processing of the raw data.

In an embodiment, a method for determining a scale used in estimating a path of a computing device in motion may comprise: receiving a plurality of pairs of points along the path based on inertial sensor data from the computer device; determining which of the plurality of pairs of points along the path are constrained, each constrained pair of points comprising a first point and a second point, the first point being associated with a first constraint having a first radius, the second point being associated with a second constraint having a second radius, the first point and the second point being separated by a distance; determining for each constrained pair of points a first bound and a second bound based on the first radius, the second radius, and the distance; determining a first intersection of the first bounds of the plurality of pairs of points and a second intersection of the second bounds of the plurality of pairs of points; and setting the scale as an intersection of the first intersection and the second intersection.

In the embodiment, the first bound may be equal to the division by the distance of the sum of the distance, the first radius, and the second radius. In the embodiment, the second bound may be equal to the division by the distance of the subtraction of the first radius and the second radius from the distance. In the embodiment, determining which of the plurality of pairs of points along the path are constrained may be based on a minimum distance separation and a maximum time separation for each pair of points among the plurality of pairs of points. In the embodiment, determining for each constrained pair of points a first bound and a second bound, may include selecting the pair of points among the plurality of pairs of points that has the closest first bound to the second bound. In the embodiment, the set scale may be closest to one in comparison to scales set as intersections associated with the remaining first bounds and second bounds. In the embodiment, determining which of the plurality of pairs of points along the path are constrained may comprise disregarding a first pair of points from the plurality of pairs of points when the first constraint of the first point in the first pair of points overlaps with or is within some distance of the first constraint of the first point in a second pair of points from the plurality of pairs of points.

In an embodiment, a method for rescaling a path of a computing device in motion, the path including a plurality of points based on inertial sensor data, a desired endpoint, and a path endpoint, may comprise: representing each pair of consecutive points with a segment to generate a plurality of segments; determining a constraint error based on a comparison of the desired end point and the path endpoint; determining a contribution of each segment of the plurality of segments to the constraint error; and adjusting each segment of the plurality of segments based on the corresponding contribution.

In the embodiment, coordinates may be associated with each point, the desired endpoint, and the path endpoint. In the embodiment, representing each pair of consecutive points with a segment may comprise generating a difference vector based on the coordinates of the consecutive points of the pair. In the embodiment, determining a constraint error may comprise generating an error vector by subtracting the coordinates of the desired endpoint from the coordinates of the path end point. In the embodiment, determining a contribution of each segment of the plurality of segments to the constraint error may comprise: dividing the error vector by the magnitude of the error vector to generate a unit vector; computing, for each difference vector, a weight as the dot product of the difference vector and the unit vector; dividing each weight by the sum of absolute values of all the weights to normalize each weight; computing, for each difference vector, the magnitude of the difference vector; determining, for each difference vector, an adjustment of the magnitude of the difference vector by multiplying the magnitude of the error vector by the normalized weight of the difference vector; and determining, for each difference vector, a scale as a function of the adjustment of the magnitude of the difference vector and the magnitude of the difference vector. In the embodiment, adjusting each segment of the plurality of segments may be based on the corresponding contribution and may comprise rescaling the difference vectors based on the scale, and reconstructing the points by cumulatively summing the rescaled difference vectors. In the embodiment, the scale may be equal to one when the normalized weight of a difference vector is equal to zero and may otherwise be equal to the division by the magnitude of the sum of the adjustment of the magnitude of the difference vector and the magnitude of the difference vector.

In an embodiment, a method for estimating a path of a computing device in motion may comprise: determining a pair of points of the path comprising a first point and a second point, the first point being associated with a first constraint having a first radius, the second point being associated with a second constraint having a second radius, the first point and the second point being separated by a distance, points of the path between the first point and the second point forming step vectors, each step vector connecting two consecutive points; multiplying each step vector with an adjustable parameter associated with a scale of the path; summing the multiplied step vectors to generate the path to generate a total step vector; determining a difference vector between the first point and the second point; subtracting the total step vector from the difference vector to form a delta vector; and adjusting the parameters associated with the scale until the magnitude of the delta vector is less than the sum of the first radius and the second radius. In the embodiment, the scale parameter may be initialized to one.

In an embodiment, a computing system for estimating a path of a computing device in motion may comprise: a processor; a memory communicatively coupled to the processor, the memory bearing instructions that, when executed on the processor, cause the computing system to at least: determine a plurality of pairs of points along the path that are constrained, each pair of points comprising a first point and a second point, the first point being associated with a first constraint having a first radius, the second point being associated with a second constraint having a second radius, the first point and the second point being separated by a distance; determine for each pair of points a first bound and a second bound based on the first radius, the second radius, and the distance; determine a first intersection of the first bounds of the plurality of pair of points and a second intersection of the second bounds of the plurality of pair of points; and set the scale as an intersection of the first intersection and the second intersection.

In an embodiment, a map of a path of a computing device in motion may be obtained based on the steps of: determining a pair of points of the path comprising a first point and a second point, the first point being associated with a first constraint having a first radius, the second point being associated with a second constraint having a second radius, the first point and the second point being separated by a distance, points of the path between the first point and the second point forming step vectors, each step vector connecting two consecutive points; multiplying each step vector with an adjustable parameter associated with a scale of the path; summing the multiplied step vectors to generate the path to generate a total step vector; determining a difference vector between the first point and the second point; subtracting the total step vector from the difference vector to form a path vector; adjusting the parameters associated with the scale until the magnitude of the path vector is less than the sum of the first radius and the second radius; and generating the map based at least in part on the points and the adjusted parameters.

In an embodiment, a computer readable storage medium may comprise instructions that, when executed on a system are configured to rescale a path of a computing device in motion, the path including a plurality of points, a desired endpoint, and a path endpoint, that cause the system to at least: represent each pair of consecutive points with a segment to generate a plurality of segments; determine a constraint error based on a comparison of the desired end point and the path endpoint; determine a contribution of each segment of the plurality of segments to the constraint error; and adjust each segment of the plurality of segments based on the corresponding contribution.

In an embodiment, a computing system for presenting a path of a computing device in motion may comprise: a processor; and a memory communicatively coupled to the processor, the memory bearing instructions that, when executed on the processor, cause the computing system to at least: present a user interface configured to receive input from a user; determine a pair of points of the path comprising a first point and a second point, the first point being associated with a first constraint having a first radius, the second point being associated with a second constraint having a second radius, the first point and the second point being separated by a distance, points of the path between the first point and the second point forming step vectors, each step vector connecting two consecutive points; multiply each step vector with an adjustable parameter associated with a scale of the path; sum the multiplied step vectors to generate the path to generate a total step vector; determine a difference vector between the first point and the second point; subtract the total step vector from the difference vector to form a path vector; adjust the parameters associated with the scale until the magnitude of the path vector is less than the sum of the first radius and the second radius; generate a visual representation of the path based at least in part on the points and the adjusted parameters; and present the visual representation at the user interface.

FIG. 8 describes a computing system that includes hardware modules, software module, and a combination thereof and that can be implemented as the computing device of the user, the server, and/or the static computing devices.

In a basic configuration, the computing system may include at least a processor, a system memory, a storage device, input/output peripherals, communication peripherals, and an interface bus. The interface bus is configured to communicate, transmit, and transfer data, controls, and commands between the various components of the computing system. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take various forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, universal serial bus, transmitter, receiver, and so on. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface that the user can use to provide input to the computing system and to receive an output from the computing system. This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a Wi-Fi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of certain of the disclosures herein.

What is claimed:

1. A method for determining a scale used in estimating a path of a computing device in motion, the method comprising:
   receiving a plurality of pairs of points along the path based on inertial sensor data from the computer device;
   determining which of the plurality of pairs of points along the path are constrained, each constrained pair of points comprising a first point and a second point, the first point being associated with a first constraint having a first radius, the second point being associated with a second constraint having a second radius, the first point and the second point being separated by a distance;
   determining for each constrained pair of points a first bound and a second bound based on the first radius, the second radius, and the distance;
   determining a first intersection of the first bounds of the plurality of pairs of points and a second intersection of the second bounds of the plurality of pairs of points; and
   setting the scale as an intersection of the first intersection and the second intersection.

2. The method of claim 1, wherein the first bound is equal to the division by the distance of the sum of the distance, the first radius, and the second radius.

3. The method of claim 1, wherein the second bound is equal to the division by the distance of the subtraction of the first radius and the second radius from the distance.

4. The method of claim 1, wherein the determining which of the plurality of pairs of points along the path are constrained is based on a minimum distance separation and a maximum time separation for each pair of points among the plurality of pairs of points.

5. The method of claim 1, wherein the determining for each constrained pair of points a first bound and a second bound includes selecting the pair of points among the plurality of pairs of points that has the closest first bound to the second bound.

6. The method of claim 1, wherein the set scale is closest to one in comparison to scales set as intersections associated with the remaining first bounds and second bounds.

7. The method of claim 1, wherein the determining which of the plurality of pairs of points along the path are constrained comprises disregarding a first pair of points from the plurality of pairs of points when the first constraint of the first point in the first pair of points overlaps with or is within some distance of the first constraint of the first point in a second pair of points from the plurality of pairs of points.

8. A method for rescaling a path of a computing device in motion, the path including a plurality of points based on inertial sensor data, a desired endpoint, and a path endpoint, the method comprising:
   representing each pair of consecutive points with a segment to generate a plurality of segments;
   determining a constraint error based on a comparison of the desired end point and the path endpoint;
   determining a contribution of each segment of the plurality of segments to the constraint error; and
   adjusting each segment of the plurality of segments based on the corresponding contribution.

9. The method of claim 8, wherein coordinates are associated with each point, the desired endpoint, and the path endpoint.

10. The method of claim 9, wherein the representing each pair of consecutive points with a segment comprises generating a difference vector based on the coordinates of the consecutive points of the pair.

11. The method of claim 10, wherein the determining a constraint error comprises generating an error vector by subtracting the coordinates of the desired endpoint from the coordinates of the path end point.

12. The method of claim 11, wherein the determining a contribution of each segment of the plurality of segments to the constraint error, comprises:
    dividing the error vector by the magnitude of the error vector to generate a unit vector;
    computing, for each difference vector, a weight as the dot product of the difference vector and the unit vector;
    dividing each weight by the sum of absolute values of all the weights to normalize each weight;
    computing, for each difference vector, the magnitude of the difference vector;
    determining, for each difference vector, an adjustment of the magnitude of the difference vector by multiplying the magnitude of the error vector by the normalized weight of the difference vector; and
    determining, for each difference vector, a scale as a function of the adjustment of the magnitude of the difference vector and the magnitude of the difference vector.

13. The method of claim 12, wherein the adjusting each segment of the plurality of segments based on the corresponding contribution comprises:
    rescaling the difference vectors based on the scale; and
    reconstructing the points by cumulatively summing the rescaled difference vectors.

14. The method of claim 12, wherein the scale is equal to one when the normalized weight of a difference vector is equal to zero and is otherwise equal to the division by the magnitude of the sum of the adjustment of the magnitude of the difference vector and the magnitude of the difference vector.

15. A method for estimating a path of a computing device in motion, the method comprising:
    determining a pair of points of the path comprising a first point and a second point, the first point being associated with a first constraint having a first radius, the second point being associated with a second constraint having a second radius, the first point and the second point being separated by a distance, points of the path between the first point and the second point forming step vectors, each step vector connecting two consecutive points;
    multiplying each step vector with an adjustable parameter associated with a scale of the path;
    summing the multiplied step vectors to generate the path to generate a total step vector;
    determining a difference vector between the first point and the second point;
    subtracting the total step vector from the difference vector to form a delta vector; and
    adjusting the parameters associated with the scale until the magnitude of the delta vector is less than the sum of the first radius and the second radius.

16. The method of claim 15, wherein the scale parameter is initialized to one.

17. A computing system for estimating a path of a computing device in motion, the computing system comprising:
- a processor;
- a memory communicatively coupled to the processor, the memory bearing instructions that, when executed on the processor, cause the computing system to at least:
- determine a plurality of pairs of points along the path that are constrained, each pair of points comprising a first point and a second point, the first point being associated with a first constraint having a first radius, the second point being associated with a second constraint having a second radius, the first point and the second point being separated by a distance;
- determine for each pair of points a first bound and a second bound based on the first radius, the second radius, and the distance;
- determine a first intersection of the first bounds of the plurality of pair of points and a second intersection of the second bounds of the plurality of pair of points; and
- set the scale as an intersection of the first intersection and the second intersection.

18. A map of a path of a computing device in motion, the map being obtained based on the steps of:
- determining a pair of points of the path comprising a first point and a second point, the first point being associated with a first constraint having a first radius, the second point being associated with a second constraint having a second radius, the first point and the second point being separated by a distance, points of the path between the first point and the second point forming step vectors, each step vector connecting two consecutive points;
- multiplying each step vector with an adjustable parameter associated with a scale of the path;
- summing the multiplied step vectors to generate the path to generate a total step vector;
- determining a difference vector between the first point and the second point;
- subtracting the total step vector from the difference vector to form a path vector;
- adjusting the parameters associated with the scale until the magnitude of the path vector is less than the sum of the first radius and the second radius; and
- generating the map based at least in part on the points and the adjusted parameters.

19. A computer readable storage medium comprising instructions that, when executed on a system configured to rescale a path of a computing device in motion, the path including a plurality of points, a desired endpoint, and a path endpoint, cause the system to at least:
- represent each pair of consecutive points with a segment to generate a plurality of segments;
- determine a constraint error based on a comparison of the desired end point and the path endpoint;
- determine a contribution of each segment of the plurality of segments to the constraint error; and
- adjust each segment of the plurality of segments based on the corresponding contribution.

20. A computing system for presenting a path of a computing device in motion, the computing system comprising:
- a processor; and
- a memory communicatively coupled to the processor, the memory bearing instructions that, when executed on the processor, cause the computing system to at least:
- present a user interface configured to receive input from a user;
- determine a pair of points of the path comprising a first point and a second point, the first point being associated with a first constraint having a first radius, the second point being associated with a second constraint having a second radius, the first point and the second point being separated by a distance, points of the path between the first point and the second point forming step vectors, each step vector connecting two consecutive points;
- multiply each step vector with an adjustable parameter associated with a scale of the path;
- sum the multiplied step vectors to generate the path to generate a total step vector;
- determine a difference vector between the first point and the second point;
- subtract the total step vector from the difference vector to form a path vector;
- adjust the parameters associated with the scale until the magnitude of the path vector is less than the sum of the first radius and the second radius;
- generate a visual representation of the path based at least in part on the points and the adjusted parameters; and
- present the visual representation at the user interface.

* * * * *